(12) United States Patent
Situ et al.

(10) Patent No.: US 7,091,839 B2
(45) Date of Patent: Aug. 15, 2006

(54) INDICATOR FOR A HYBRID ELECTRIC VEHICLE

(75) Inventors: Lixin Situ, Canton, MI (US); Joseph Valascho, Utica, MI (US); Venkateswa Sankaran, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 10/708,511

(22) Filed: Mar. 9, 2004

(65) Prior Publication Data

US 2005/0200463 A1    Sep. 15, 2005

(51) Int. Cl.
*B60Q 1/00* (2006.01)
(52) U.S. Cl. .................. 340/438; 340/439; 340/461; 340/462; 340/466; 340/815.4; 340/815.45
(58) Field of Classification Search ................ 340/438, 340/439, 441, 445, 456, 461, 636, 815.45, 340/815.5, 815.4, 462, 425.5, 466; 180/65.2; 324/115, 131, 160, 166
See application file for complete search history.

(56) References Cited

U.S. PATENT DOCUMENTS

| | | | |
|---|---|---|---|
| 5,406,303 A * | 4/1995 | Salmon et al. ............. 345/75.1 |
| 5,566,774 A | 10/1996 | Yoshida | |
| 5,686,895 A * | 11/1997 | Nakai et al. ............. 340/636.1 |
| 5,717,268 A | 2/1998 | Carrier et al. | |
| 6,073,087 A | 6/2000 | Thiele et al. | |
| 6,144,116 A | 11/2000 | Berger et al. | |
| 6,182,634 B1 | 2/2001 | Caldwell et al. | |
| 6,215,298 B1 | 4/2001 | Westberg et al. | |
| 6,259,998 B1 | 7/2001 | Crunk | |
| 6,404,332 B1 | 6/2002 | Wakashiro et al. | |
| 6,480,106 B1 | 11/2002 | Crombez et al. | |
| 6,581,707 B1 | 6/2003 | Morimoto et al. | |
| 6,625,562 B1 | 9/2003 | Hayashi et al. | |
| 2002/0171541 A1 | 11/2002 | Crombez et al. | |
| 2003/0074158 A1 | 4/2003 | Hayashi et al. | |
| 2003/0164756 A1 | 9/2003 | Hayashi et al. | |
| 2005/0128065 A1* | 6/2005 | Kolpasky et al. | |

FOREIGN PATENT DOCUMENTS

| | | |
|---|---|---|
| JP | 7-315078 A | 12/1995 |
| JP | 10-129298 A | 5/1998 |
| JP | 11-208313 A | 8/1999 |

* cited by examiner

*Primary Examiner*—Hung Nguyen
(74) *Attorney, Agent, or Firm*—David B. Kelley; Brooks & Kushman

(57) ABSTRACT

An indicator for use with an electric vehicle having an engine and an electric traction motor. The indicator includes a tachometer gauge for displaying engine revolution speed. The indicator further includes an electric only indicator for displaying whether the vehicle is operating in an electric only mode.

20 Claims, 2 Drawing Sheets

INDICATOR FOR A HYBRID ELECTRIC VEHICLE

BACKGROUND OF INVENTION

1. Field of the Invention

The present invention relates to indicators for use in hybrid electric vehicles having an internal combustion engine and at least one electric traction motor.

2. Background Art

Hybrid electric vehicles typically include an internal combustion engine and an electric traction motor arranged in series, parallel and parallel/series configurations.

With such vehicles, it is desirable for an operator to know that the engine and/or the electric motor is running. The driver can easily tell that the engine is running because of the noise it produces by the engine. In contrast, the low noise of the motor can make it difficult for the driver to tell whether the motor is running. In some cases, the electric motor noise can be so low that the driver may not even hear it running.

Accordingly, there exists a need to indicate to the driver that the electric motor is running.

SUMMARY OF INVENTION

One aspect of the present invention relates to instrument clusters configured for an electric vehicle having an engine and an electric traction motor. In accordance with the present invention, the instrument cluster can include a tachometer gauge and an electric only indicator.

The tachometer gauge can be arcuate shaped and include a needle pointer for displaying revolutions per minute (RPM) of the engine by pointing to a portion of the gauge.

The cluster can also include an electric only indicator. The electric only indicator is active when the vehicle is in electric only mode to indicate that the motor is running.

The electric only indicator can be positioned below a zero increment of the tachometer gauge to be reached by the needle pointer for indicating electric only mode. The needle pointer can then be controlled to point to the gauge to indicate an electric only mode. Alternatively, the electric only indicator can include an LED to illuminate a graphic for indicating electric only mode.

The cluster can also include a controller. The controller can be configured for receiving an RPM signal and an engine on/off signal from a vehicle controller. The controller can then control a positioning of the needle to point it at desired portions of the tachometer gauge. In addition, the controller can control the needle to point at the electric only indicator or to illuminate the LED. This allows the controller to indicate RPM or to indicate the electric only mode.

The controller can be configured to indicate electric only mode if any of the following conditions are true: the RPM is less than a predefined threshold; the RPM signal is missing for a predefined period of time and an engine on/off signal indicates the engine is off; or the RPM signal is invalid for a predefined period of time and the engine on/off signal indicates the engine is off.

It is, therefore, an advantage of the present invention that the indicator can be used for indicating to the driver that the electric motor is running even though the driver may not hear the motor running.

DETAILED DESCRIPTION

Figure 1:
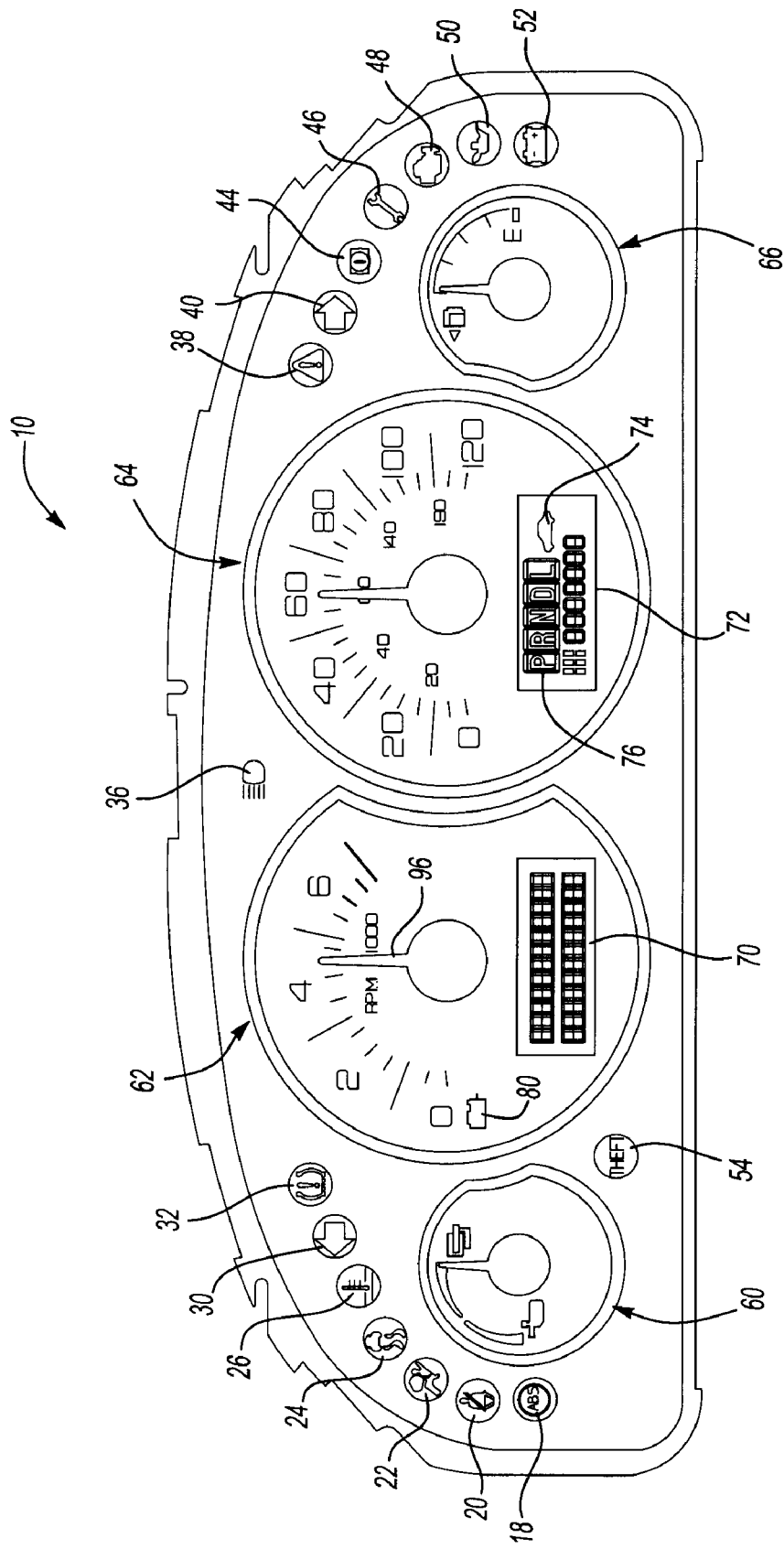
FIG. 1 illustrates an instrument panel cluster in accordance with the present invention.

FIG. 1 illustrates instrument cluster 10. Instrument cluster 10 communicates information to a driver through a number of indicators. The driver can use the indicators for monitoring and controlling vehicle operation.

Instrument cluster 10 can be used with any electric vehicle having an engine and an electric traction motor where one or both of the engine and motor can be used to drive the vehicle. One common type of electric vehicle which is suitable for the present invention are so called hybrid electric vehicles and include series hybrid electric vehicles (SHEV), parallel hybrid electric vehicles (PHEV), and parallel/series (powersplit) hybrid electric vehicles (PSHEV).

Instrument cluster 10 includes anti-lock braking system (ABS) indicator 18, seat belt indicator 20, air bag indicator 22, traction indicator 24, temperature indicator 26, left turn signal indicator 30, information indicator 32, high beam indicator 36, engine warning indicator 38, right turn signal indicator 40, parking brake indicator 44, service indicator 46, transmission indicator 48, oil change indicator 50, battery indicator 52, and theft indicator 54.

Instrument cluster 10 further includes temperature gauge 60, tachometer gauge 62, speed gauge 64, and oil gauge 66. These gauges display levels relative to value ranges printed thereon. Tachometer gauge 62 and speed gauge 64 further include alphanumeric displays 70 and 72 to provide alphanumeric messages.

Alphanumeric gauge 72 includes engine ready indicator 74 and PRND indicators 76. Indicators 70 and 72 are digitally controlled and provide the display by illuminating light emitting diodes (LEDs) or liquid crystals. Virtually any message can be provided by the alphanumeric indicators.

Tachometer gauge 62 includes electric only indicator 80. Electric only indicator 80 is preferably a binary indicator having a graphic shaped like a motor. Electric only indicator 80 can include a chim (not shown) for chimming upon initial activation of electric only mode.

Electric only indicator 80 indicates whether electric only mode is on or off. Electric only mode corresponds with an engine of the vehicle being shutoff yet the vehicle is still capable of being driven by an electric traction motor.

Electric only indicator 80 allows the driver to know that the electric motor is running and that the vehicle can still be driven even though the driver is not hearing the engine or the electric motor. This is advantageous because the electric motor tends produces low noise that can be so low that the driver cannot hear it running. Electric only indicator 80 eliminates the problem of the driver having difficulty in determining whether the electric motor can be used to drive the vehicle.

Figure 2:
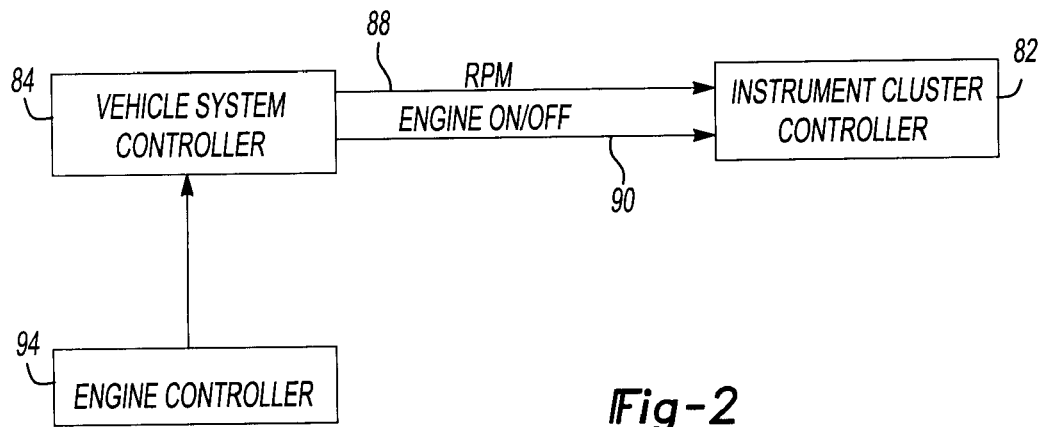
FIG. 2 illustrates control of the instrument panel in accordance with the present invention.

FIG. 2 schematically illustrates control of instrument panel 10 in accordance with the present invention. Controller 82 is provided to control instrument cluster 10 and the indicator therein. Without limiting the present invention, controller 82 at least receives signals from vehicle system controller 84 to control tachometer gauge 62 and electric only gauge 80.

Controller 82 preferably receives engine revolution speed signals in the form of revolutions per minute (rpm) signal 88 and an engine on/off signal 90. Engine on/off signal 90 indicates whether the engine is on or off, i.e., whether the engine is receiving gas for internal combustion. Other signals can also be received by controller 82 for controlling the other indicators and gauges but these signals are not shown.

RPM signal 88 and engine on/off signal 90 are communicated to vehicle system controller 84 by engine controller 94. Engine controller 94 controls the engine as understood by one having ordinary skill in the art. Alternatively, RPM signal 88 and engine on/off signal 90 can be communicated directly to controller 82 from engine controller 94.

Controller 82 controls positioning of tachometer needle 96 based on RPM signal 88 during engine operation. As shown, tachometer gauge 62 includes an arcuate range pattern of 0 to 6,000 RPM printed thereon. Tachometer needle 96 is positioned by controller 82 to one of the RPM increments to display to the driver the current RPM of the engine.

In one aspect of the present invention, controller 82 can also control tachometer needle 96 to indicate electric only mode. This is done by positioning tachometer needle 96 to a position below the zero increment corresponding with electric only indicator 80. This is done when the engine is shutoff and to indicate the vehicle can still be driven by the electric traction motor, i.e., when the vehicle is operating in electric only mode.

Controller 82 periodically checks RPM signal 88 to determine whether engine is shutoff. Preferably, controller 82 checks RPM signal 88 every 100 ms to determine the engine to be shutoff if RPM signal 88 drops below a predefined threshold, typically 100 RPM. Other conditions can also be required to determine electric only mode beyond merely determining that the engine is shut down. Preferably, the controller must determine a successful engine start and that a battery used to power to the electric motor is sufficiently charged. This is done to prevent false indications caused by initial turn on of the vehicle or insufficient battery charge to drive the vehicle.

Some conditions can prevent communication of RPM signal 88 to controller 82. Other conditions can cause invalid communication of RPM signal 88 to controller 82. Controller 82 is still able to determine electric only mode during these conditions based on engine on/off signal 90. Preferably, electric only mode is determined if RPM signal 88 is missing for more than a predefined period of time and engine on/off signal 90 indicates the engine is off or if RPM signal is invalid for a predefined period of time and engine on/off signal 90 indicates the engine is off. The period of time in both cases is typically one second.

In one aspect of the present invention, controller 82 can also indicate electric only mode activation without controlling tachometer needle 96. In this case, an LED (not shown) is provided for illuminating electric only indicator 80. The vehicle is in electric only mode when electric only indicator 80 is illuminated and is not in electric only mode when electric only indicator 80 is unilluminated. The determinations of whether the vehicle is in electric only mode is determined as described above.

Figure 3:
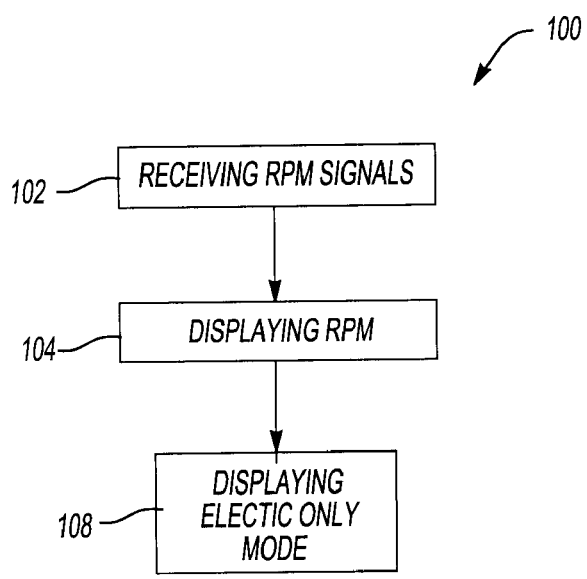
FIG. 3 illustrates a flowchart of a method for indicating electric only mode in accordance with the present invention.

FIG. 3 illustrates flowchart 100. Flowchart illustrates a method for indicating engine and motor mode operation in electric vehicles having an engine and an electric motor.

Block 102 relates to receiving signals from vehicle system controller 84. Preferably, the signals at least include RPM signal 88 and are received by controller 82, and optionally engine on/off signal 90. The addition of engine on/off signals can be advantageous for indicating electric only mode if RPM signal 88 is missing or invalid.

Block 104 relates to displaying the RPM on tachometer gauge 62 based on the signals received in block 102. The RPM can be display by controlling tachometer needle 96 as described above. Alternatively, a digital display (not shown) can replace arcuate range.

Block 108 relates to displaying in a binary display electric only mode if the RPM drops below a predefined threshold. This can be done by controller 82 either positioning tachometer needle to electric only indicator 80 or by illuminating electric only indicator 80, as described above. In addition, this can further include controller 82 activating a chim upon initial activation of electric only indicator 80.

While the best mode for carrying out the invention has been described in detail, those familiar with the art to which this invention relates will recognize various alternative designs and embodiments for practicing the invention as defined by the following claims.

The invention claimed is:

1. An indicator for a vehicle having an engine and an electric motor, the indicator comprising:
    a tachometer gauge for displaying engine revolution speed; and
    an electric only indicator for displaying whether the vehicle is operating in an electric only mode.

2. The indicator of claim 1, wherein the electric only indicator is integrated as part of the tachometer and further includes a needle-pointer to point at increments of the tachometer gauge to indicate engine revolution speed and to point at an electric only indicator to indicate operation in the electric only mode.

3. The indicator of claim 2, wherein the electric only indicator includes a graphic symbol and is positioned below a zero increment of the tachometer.

4. The indicator of claim 1, wherein the electric only indicator is a binary display.

5. The indicator of claim 4, wherein the binary display is illuminated to indicate electric only mode.

6. The indicator of claim 1, further comprising a controller to control the tachometer gauge and the electric only indicator.

7. The indicator of claim 1, wherein electric only mode is displayed only if an engine revolution speed drops below a predefined threshold.

8. The indicator of claim 1, wherein the electric only mode is displayed if an engine revolution speed signal is not received for a predefined period of time and an engine on/off signal indicates the engine is off.

9. The indicator of claim 1, wherein the electric only mode is displayed if an engine revolution speed signal is invalid for a predefined period of time and an engine on/off signal indicates the engine is off.

10. The indicator of claim 1, wherein the electric only indicator is activated only after a successful engine start.

11. The indicator of claim 1, wherein the electric only indicator is activated only after a battery charge of a battery used to drive the electric motor is greater than a predefined battery charge threshold.

12. The indicator of claim 1, further comprising an audio sound generator for audibilizing activation of the electric only indicator.

13. The indicator of claim 1, wherein the electric only indicator does not indicate energy available for driving the electric motor.

14. A method for indicating electric only mode operation of a hybrid electric vehicle having an internal combustion engine and an electric motor, the method comprising:
    determining an engine speed;

displaying the engine speed in revolutions per minute (RPM) on a tachometer gauge; and displaying in a display an electric only mode if the RPM drops below a predefined threshold.

15. The method of claim 14, wherein the electric only mode is displayed by controlling a needle used to select increments on the tachometer gauge to point to an electric only indicator.

16. The method of claim 15, wherein controlling the pointer to point to the electric only indicator comprises controlling the needle to point to a position below a zero increment of the tachometer gauge.

17. The method of claim 14, wherein the electric only mode is displayed by controlling an LED to illuminate the electric only indicator.

18. The method of claim 14, further comprising determining an engine on/off status, and displaying the electric only mode if the engine is off and engine speed is zero.

19. An instrument cluster for a hybrid vehicle having an internal combustion engine and an electric traction motor, the cluster comprising:

a tachometer gauge having a needle pointer for displaying a revolutions per minute (RPM) of the engine; and an electric only indicator positioned below a zero increment of the tachometer gauge and reachable by the needle pointer for displaying an electric only mode.

20. The instrument cluster of claim 19, further comprising a controller configured for receiving an RPM signal and an engine on/off signal from a vehicle controller, wherein the controller controls the needle to point at the electric only indicator to indicate the electric only mode if any of the following conditions are true:

(i) the RPM is less than a predefined threshold;

(ii) the RPM signal is missing for a predefined period of time and the engine on/off signal indicates the engine is off; or (iii) the RPM signal is invalid for a predefined period of time and the engine on/off signal indicates the engine is off.

* * * * *